United States Patent

Brahm et al.

[11] Patent Number: 6,111,053
[45] Date of Patent: Aug. 29, 2000

[54] OLEFINICALLY UNSATURATED POLYISOCYANATES

[75] Inventors: Martin Brahm, Engelskirchen; Eberhard Arning, Kaarst; Lutz Schmalstieg; Harald Mertes, both of Köln; Jürgen Schwindt, Leverkusen, all of Germany

[73] Assignee: Bayer Aktiengesellschaft, Leverkusen, Germany

[21] Appl. No.: 08/436,939

[22] Filed: May 8, 1995

[30] Foreign Application Priority Data

May 20, 1994 [DE] Germany .............................. 44 17 745

[51] Int. Cl.[7] ....................................................... C08G 18/62
[52] U.S. Cl. ............................. 528/75; 528/49; 526/301; 526/312; 252/182.18; 560/330; 560/355
[58] Field of Search ........................ 528/49, 75; 526/312, 526/301; 252/182.18; 560/355, 330

[56] References Cited

U.S. PATENT DOCUMENTS

| | | | |
|---|---|---|---|
| 4,160,080 | 7/1979 | Köenig et al. ............................. | 528/59 |
| 4,810,820 | 3/1989 | Slack et al. ............................... | 560/27 |
| 5,208,334 | 5/1993 | Potter et al. ............................. | 544/193 |
| 5,235,018 | 8/1993 | Potter et al. ............................. | 528/49 |
| 5,283,311 | 2/1994 | Narayan et al. .......................... | 528/49 |

FOREIGN PATENT DOCUMENTS

| | | |
|---|---|---|
| 2115684 | 8/1994 | Canada . |
| 2122177 | 10/1994 | Canada . |
| 566037 | 10/1993 | European Pat. Off. . |
| 994890 | 6/1965 | United Kingdom . |

*Primary Examiner*—Rachel Gorr
*Attorney, Agent, or Firm*—Joseph C. Gil; Thomas W. Roy

[57] ABSTRACT

The invention relates to olefinically unsaturated polyisocyanates containing allophanate groups and having an NCO content of 6 to 20% by weight, an iodine value of 15 to 150, a content of hydrocarbon chains containing 12 to 30 carbon atoms of 100 to 700 mg/g and a content of allophanate groups of 10 to 300 mg/g, to a process for their production by reaction of a polyisocyanate component containing urethane groups with excess polyisocyanates, and to a one-component coating composition containing these olefinically unsaturated polyisocyanates as binders.

15 Claims, No Drawings

OLEFINICALLY UNSATURATED POLYISOCYANATES

BACKGROUND OF THE INVENTION

1. Field of the Invention

This invention relates to olefinically unsaturated polyisocyanates containing allophanate groups, to a process for their production and to their use as binders in one-component coating compositions.

2. Description of the Prior Art

One-component coating compositions based on NCO-functional urethane prepolymers are known (Houben-Weyl, Methoden der Organischen Chemie, Vol. E 20, page 1646, Georg Thieme Verlag 1987). They are prepared by reaction of diisocyanates or modified diisocyanates with polyols of relatively high functionality, such as polyether and polyester polyols. Their relatively high molecular weight structure provides these compounds with good film-forming properties and the resulting coatings with good optical properties. However, because they also have a relatively high viscosity, they can only be used as lacquer binders in heavily diluted form or in combination with a considerable amount of monomeric diisocyanate. However, high concentrations of monomeric isocyanate are physiologically unacceptable. In addition, the use of large quantities of solvent is ecologically unacceptable. The gap between a high molecular weight, high-functionality structure having a high viscosity, but resulting in excellent product properties on the one hand and low molecular weight, low-viscosity products with inadequate solvent resistance and inadequate drying properties on the other hand cannot be closed by NCO-functional prepolymers prepared as described above.

In addition to NCO-functional coating materials, one-component systems crosslinkable by oxidation have also been described (Ullmann, Enzyklopadie der technischen Chemie, 4th Edition, Vol. 19, pages 75 et seq., Verlag Chemie Weinheim, Deerfield Beach, Fla./Basel 1980). These systems also can only be used as binders for coating compositions in the form of dilute solutions.

Coating compositions which have both an oxidative drying mechanism and an isocyanate-crosslinking drying mechanism were previously unknown.

However, it has now surprisingly been found that olefinically unsaturated, allophanate polyisocyanates prepared from (cyclo)aliphatic polyisocyanates, preferably diisocyanates, and olefinically unsaturated, preferably monohydric alcohols represent interesting binders for one-component coating compositions which may be cured by oxidation and under the effect of moisture. These binders are particularly suitable for the production of solventless or low-solvent coating compositions having good lacquer properties, rapid chemical drying at room temperature and universal and physiologically safe usability.

Polyisocyanates containing allophanate groups are known, for example, from EP-A-0,000,194, EP-A-0,303,150 or GB-PS 994,890. Although olefinically unsaturated alcohols are also mentioned occasionally as starting materials in long lists of suitable alcohols, there is no specific reference to olefinically unsaturated allophanate polyisocyanates of the type according to the present invention and no specific reference to their use in one-component, oxidation- and moisture-curing coating compositions.

The allophanate polyisocyanates described in EP-A-0,524,500, EP-A-0,524,501 and EP-A-0,566,037 are not based on unsaturated alcohols and are recommended as crosslinking agents for two-component coating compositions.

Applicants' earlier German patent applications P 43 05 162.6 and P 43 14 252.4 relate to olefinically unsaturated isocyanates which may be used as binders in one-component coating compositions. However, these isocyanates are not polyisocyanates containing allophanate groups of the type according to the invention.

SUMMARY OF THE INVENTION

The present invention relates to olefinically unsaturated polyisocyanates which contain allophanate groups and have
  a) an NCO content of 6 to 20% by weight,
  b) a content of olefinic double bonds corresponding to an iodine value of 15 to 150,
  c) a content of hydrocarbon chains containing 12 to 30 carbon atoms of 100 to 700 mg/g and
  d) a content of allophanate groups (expressed as $C_2HN_2O_3$, molecular weight=101) of 10 to 300 mg/g.

The present invention also relates to a process for the production of these olefinically unsaturated polyisocyanates by
  1) preparing an isocyanate component U containing urethane groups by reacting at an NCO:OH equivalent ratio of 4:1 to 120:1
    A1) a polyisocyanate component having an NCO content of 20 to 61% by weight and an average NCO functionality of 1.8 to 2.5 and containing one or more organic polyisocyanates with
      B) an alcohol component having an average hydroxyl functionality of 1.0 to 1.8 and containing
      B1) 80 to 100% by weight, based on the weight of alcohol component B), of an olefinically unsaturated alcohol component having an iodine value greater than 60 and containing one or more olefinically unsaturated alcohols having a hydrocarbon chain with an average chain length of at least 12 carbon atoms and
      B2) 0 to 20% by weight, based on the weight of alcohol component B) of a saturated alcohol component containing one or more saturated alcohols having a molecular weight of 32 to 300,
  2) reacting isocyanate component U with
    A2) a polyisocyanate component having an NCO content of 20 to 61% by weight and an average NCO functionality of 1.8 to 2.5 and containing one or more organic polyisocyanates,
  at an equivalent ratio of isocyanate groups of component A2) to urethane groups of component U of at least 3:1 and optionally in the presence of catalysts accelerating the reaction of urethane groups with isocyanate groups to form allophanate groups and
  3) subsequently removing excess, distillable starting polyisocyanates by distillation to obtain a product containing at most 0.5% by weight of said distillable starting polyisocyanates.

The present invention further relates to the use of the olefinically unsaturated polyisocyanates according to the invention as binders for one-component coating materials to be applied at room temperature.

Finally, the invention also relates to a one-component coating composition containing
  (i) a binder containing the olefinically unsaturated polyisocyanates according to the invention and
  (ii) catalysts which accelerate an oxidative crosslinking reaction.

DETAILED DESCRIPTION OF THE INVENTION

The polyisocyanate component to be used as starting component A1) in the process according to the invention has an NCO content of 20 to 61 % by weight, preferably 20 to 50% by weight, and an average NCO functionality of 1.8 to 2.5, preferably 2. Polyisocyanate component A1) is preferably selected from aliphatic or cycloaliphatic diisocyanates, such as 1,4-diisocyanatobutane, 1,5-diisocyanatopentane, 1,6-diisocyanatohexane (HDI), 1,11-diisocyanatoundecane, dodeca-methylene diisocyanate, 2,2,4- and 2,4,4-trimethyl-1,6-diisocyanato-hexane, 1-isocyanato-3,3,5-trimethyl-5-isocyanatomethyl cyclohexane (IPDI), 1,3-diisocyanatocyclobutane, 1,3- and 1,4-diisocyanatocyclo-hexane, 4,4'-bis-(isocyanatocyclohexyl)-methane, 1,2-bis-(isocyanato-methyl)-cyclobutane, 1,3- and 1,4-bis-(isocyanatomethyl)-cyclohexane, hexahydro-2,4- and/or -2,6-diisocyanatotoluene, bis-isocyanatomethyl norbornane (isomer mixture), 2,5- and 2,6-bis-(isocyanatomethyl)-bicyclo[2.2.1]heptane, 1-isocyanato4(3)-isocyanatomethyl-1-methyl cyclohexane or p-xylylene diisocyanate, 2,3-bis-(8-isocyanatooctyl)4-octyl-5-hexyl cyclohexane and mixtures thereof.

Component A1) may also contain modification products of the preceding diisocyanates containing biuret, uretdione, isocyanurate, allophanate and/or carbodiimide groups. Monofunctional isocyanates may also be used to obtain special properties, although there use not preferred.

In a particularly preferred embodiment, component A1) is selected from 1,6-diisocyanatohexane (HDI), 1-isocyanato-3,3,5-trimethyl-5-iso-cyanatomethyl cyclohexane (IPDI) and mixtures of these two diiso-cyanates.

Polyisocyanate component A2) is an organic polyisocyanate or polyisocyanate mixture selected from the suitable polyisocyanates previously set forth for use as polyisocyanate component A1). The distinction between polyisocyanates A1) and polyisocyanates A2) is necessary because, even though both polyisocyanates are selected from the same polyisocyanates, polyisocyanate component A2) does not have to be the same as polyisocyanate component A1). The polyisocyanate component A2) is either the excess of starting polyisocyanate A1) present in the reaction mixture after urethane formation from components A1) and B) or a mixture of this excess starting polyisocyanate A1) with an additional polyisocyanate—added after urethane formation—which may differ from the polyisocyanate A1).

80 to 100%, preferably 100%, of alcohol component B) is made up of olefinically unsaturated alcohols B1) and optionally up to 20% of saturated alcohols B2). Alcohol component B) has an average hydroxyl functionality of 1 to 1.8, preferably 1 to 1.2 and more preferably 1.

Olefinically unsaturated alcohol component B1) has an iodine value above 60, preferably above 80 and, more preferably from 100 to 300. It is selected from olefinically unsaturated alcohols having a hydrocarbon chain containing an average of at least 12, preferably at least 14 and more preferably 14 to 20 carbon atoms. The unsaturated alcohol component B1) is preferably selected from monohydric alcohols which are derived from the corresponding acids or acid mixtures of unsaturated synthetic and natural fatty acids. Naturally occurring fatty acid mixtures include the acids derived from castor oil, peanut oil, cottonseed oil, safflower oil, wood oil, soybean oil, sunflower oil, linseed oil, rapeseed oil, tall oil, sperm oil and herring oil. Fatty alcohols or mixtures containing an average of 14 to 20 carbon atoms are particularly preferred.

The olefinically unsaturated alcohol component B1) may also contain at least a portion of ether- or ester-functional alkoxylation products of the olefinically unsaturated alcohols or fatty acids previously mentioned, provided that the use of such alkoxylation products satisfies the requirements with regard to the functionality and iodine value of component B). The use of such alcohols containing ether groups is less preferred.

The olefinically unsaturated alcohol component B1) may also contain at least a portion of the transesterification products of olefinically unsaturated fats or oils with polyhydric alcohols, such as glycerol, trimethylol propane, pentaerythritol and/or sorbitol, provided that the use of such olefinically unsaturated transesterification products satisfies the requirements with regard to the functionality and iodine value of component B).

Alcohol component B2) may optionally be used in a quantity of up to 20% by weight, based on the total weight of component B), and is selected from saturated alcohols having a molecular weight of 32 to 300. Suitable alcohols include monohydric alcohols, such as methanol, ethanol, n-propanol, isopropanol, methoxypropanol, the isomeric butanols, pentanols and hexanols, n-heptanol, n-octanol, n-nonanol, n-decanol, n-dodecanol, n-octadecanol, Lorol alcohols, saturated fatty alcohols and mixtures thereof. Also suitable are polyhydric alcohols, such as ethylene glycol, propane-1,2- and -1,3-diol, butane-1,4- and -1,3-diol, hexane-1,6-diol, octane-1,8-diol, nonane-1,9-diol, decane-1, 10-diol, dodecane-1, 12-diol, octadecane-1, 18-diol, neopentyl glycol, 1,4-bis-hydroxymethyl cyclohexane, 2-methylpropane-1,3-diol, 2,2,4-trimethyl-pentane-1,3-diol, 2-ethylhexane-1,3-diol, glycerol, trimethylol propane, trimethylol ethane, the isomeric hexanetriols, pentaerythritol, sorbitol and mixtures of these saturated alcohols.

In the process according to the invention, the type and quantities of the starting materials must be selected within the limits of the foregoing disclosure such that end products having the parameters mentioned above under a) to d) are ultimately obtained.

The process according to the invention may be carried out by reacting components A1) and B) in an NCO/OH equivalent ratio of 4:1 to 120:1, preferably 6:1 to 60:1 and more preferably 8:1 to 30:1 in a single stage via the urethane intermediate stage to form the end products containing allophanate groups. This reaction according to the invention, which proceeds via the urethane intermediate stage, generally takes place at a temperature of 30 to 200° C. and preferably at a temperature of 50 to 160° C., the temperature gradually being increased within these ranges. Known catalysts for accelerating the allophanatization reaction between urethane and isocyanate groups are preferably used at least during the allophanatization portion of the reaction.

Suitable catalysts include triethylamine, tributylamine, N,N,N'N'-tetramethylbutyl-1,4-diamine, bis(dimethylamino)ethyl ether, dimethyl ethanolamine, 1,4-diaza-bicyclo[2,2,2]octane, diazobicycloundecene, N,N-dimethylbenzylamine, 1- and 2-methyl imidazole, tris(dimethylamino-methyl)-phenol, pyridine, Mannich bases, morpholines, tetraalkyl-ammonium hydroxides, trimethyl benzylammonium hydroxide and alkali metal hydroxides (such as sodium hydroxide), alkali metal phenolates, metal salts (such as iron(III) chloride, potassium octoate), zinc compounds (such as zinc octoate, zinc stearate and zinc acetyl acetonate), tin compounds (such as tin(II) octoate, tin(II)ethylhexanoat, tin(II) laurate, aluminum tri (ethylacetoacetate), dibutyl tin oxide, dibutyl tin dichloride, dibutyl tin diacetate, dibutyl tin dilaurate, dibutyl tin maleate and dioctyl tin diacetate) and mineral acids (such as sulfuric acid, hydrochloric acid, phosphoric acid and perchloric acid). These catalysts are generally used in quantities of 0 to 5% by weight, based on the reaction mixture.

The reaction according to the invention is preferably carried out in two stages by initially reacting components A1) and B) in a preliminary reaction at temperatures of up to 120° C. to form the corresponding reaction products containing urethane groups, followed by allophanatization at elevated temperatures of up to 200° C., preferably up to 160° C.

Whereas, in the single-stage procedure mentioned above, the polyisocyanate component A2) corresponds to the excess of unreacted starting polyisocyanate A1) still present after urethanization reaction, another embodiment of the two-stage procedure mentioned above is also possible and often preferred. According to this variant, the polyisocyanate component A2) used for the allophanatization reaction is a mixture of unreacted excess starting polyisocyanate A1) and an additional starting polyisocyanate added after urethanization. For example, a preferred procedure is characterized in that the urethanization is carried out solely using IPDI and HDI is added to the reaction mixture as an additional diisocyanate after urethanization and before allophanatization.

In all of these embodiments, the excess distillable starting diisocyanate is removed by distillation, preferably by thin-layer distillation, after the reaction to a residual content in the end product of less than 0.5% by weight, preferably less than 0.2% by weight. The polyisocyanates according to the invention obtained in this way have the following characteristic data:

a) an NCO content of 6 to 20%, preferably 7 to 16%, b) an iodine value of 15 to 150, preferably 30 to 150, c) a content of hydrocarbon chains containing 12 to 30 carbon atoms of 100 to 700 mg/g of polyisocyanate, preferably 300 to 600 mg/g of polyisocyanate, d) a content of allophanate groups (expressed as $C_2HN_2O_3$, molecular weight 101) of 10 to 300 mg/g of polyisocyanate, preferably 40 to 200 mg/g of polyisocyanate.

In general, catalysts which are known to accelerate the oxidative crosslinking process are added to the polyisocyanates according to the invention before they are used in accordance with the invention. Catalysts such as these are mentioned, for example, in Ullmann, Enzyklopädie der technischen Chemie, 4th Edition, Vol. 23, page 421 (Trockenstoffe), Verlag Chemie 1983, and in DE-OS 4,032,546 and the literature cited therein. Examples include cobalt, lead, magnesium, zirconium, aluminum, manganese, calcium, cerium, copper, nickel, vanadium, barium and zinc siccatives and mixtures thereof. Known catalysts for accelerating isocyanate addition reactions of the type mentioned by way of example above may also be added to the polyisocyanates according to the invention before they are used in accordance with the invention.

To alter the properties of the coating compositions obtained in accordance with the invention, other nonfunctional polymers or NCO-functional additives and polymer components, which are capable of oxidative crosslinking, may be used as additional binder components. These binder components are generally used in a quantity of at most 60% and preferably in a quantity of at most 20% by weight, based on the total weight of all binders. In a particularly preferred embodiment, no other binder components are employed.

Suitable other binder components include alkyd resins of the type defined, for example, in Römpp's Chemielexikon, Vol. 1, page 202, Frankh'sche Verlagsbuchhandlung, Stuttgart, 1966 or in D. H. Solomon, The Chemistry of Organic Filmformers, pages 75 to 101, John Wiley & Sons Inc., New York, 1967. NCO-functional binder components which may be used in addition to the polyisocyanates according to the invention include derivatives of organic diisocyanates containing urea groups, urethane groups, isocyanurate groups, uretdione groups, biuret groups and/or allophanate groups, particularly those previously described for use as component A).

Known additives may also be used in the coating compositions according to the invention. Typical additives include solvents, although solvents should generally be used in only small quantities so that the solids content of the coating materials is greater than 80% by weight, preferably greater than 85% by weight and more preferably greater than 90% by weight. It is preferred not to use solvents, particularly when the polyisocyanates used as the polyisocyanates according to the invention have a viscosity at 23° C. of 30 to 3000 mPa.s. The viscosity of the polyisocyanates according to the invention can be determined by a few preliminary tests.

Suitable solvents include toluene, xylene, cyclohexane, chlorobenzene, butyl acetate, ethyl acetate, ethyl glycol acetate, pentyl acetate, hexyl acetate, methoxypropyl acetate (MPA), tetrahydrofuran, dioxane, acetone, methyl ethyl ketone, white spirits, relatively highly substituted aromatics, for example, those commercially available under the tradenames of Solvent Naphtha, Solvesso, Shellsol, Isopar, Nappar and Diasol, heavy gasoline, tetralin, decalin, alkanes containing more than 6 carbon atoms and mixtures of these solvents.

Other additives, which may be used in the coating compositions according to the invention, are known and include wetting agents, flow control agents, antiskinning agents, antifoaming agents, matting agents, (such as for example silica, aluminum silicates and high-boiling waxes), viscosity regulators, pigments, dyes, UV absorbers and stabilizers against thermal and oxidative degradation.

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be used in the form of clear lacquers or in the form of pigmented lacquers.

The coating compositions generally cure over a period of 1 to 24 hours at 20° C. to form high-quality coatings. However, curing may also take place at lower temperatures (for example −5° C.) or more quickly at higher temperatures of up to 130° C.

The following examples and comparison examples are intended to illustrate the invention without limiting it in any way. All quantities in "parts" and "%" are by weight unless otherwise indicated.

EXAMPLES

Example 1

2580 g (30.7 equiv) of 1,6-hexamethylene diisocyanate were introduced into a nitrogen-purged stirred reactor, followed by the addition at 60° C. of 417 g (1.54 equiv) of dehydrated monohydric fatty alcohol (HD-Ocenol 110/130, iodine value: 110–130, a product of Henkel KGaA). After a reaction time of 2 hours under nitrogen, the reaction temperature was increased to 130° C. and 50 ppm of tin(II) octoate were added as catalyst. After an allophanatization time of about 7.5 hours, an NCO content of 38.1 % was reached. The excess diisocyanate was then removed by thin-layer distillation in a high vacuum (0.1 to 0.3 mbar) at a temperature of 150° C.

| Product data: | |
|---|---|
| Yield: | Approx. 1000 g |
| NCO content: | 13.9% |
| Viscosity (23° C.): | 280 mPa · s |
| free HDI content: | <0.03% |
| Iodine value: | 54 |
| Allophanate group content: | 160 mg/g (calculated) |

Content of hydrocarbon chains having an average of 18 carbon atoms: 410 mg/g

Example 2

250 g (2.25 equiv) of isophorone diisocyanate were introduced into a nitrogen-purged stirred reactor, followed the addition at 60° C. of 61.2 g (0.22 equiv) of dehydrated the monohydric fatty alcohol of Example 1. After a reaction time of about 2 hours under nitrogen, an NCO content of 27% was reached. 189 g (2.25 equiv) of 1,6-hexamethylene diisocyanate were added to the reaction mixture and, after heating to 140° C., 50 ppm of tin(II) octoate were added as catalyst. After an allophanatization time of about 3 hours, an NCO content of 33.6% was reached. The excess diisocyanate is then removed by thin layer distillation in a high vacuum (0.1 to 0.3 mbar) at a temperature of 150° C.

| Product data: | |
|---|---|
| Yield: | Approx. 140 g |
| NCO content: | 12.13% |
| Viscosity (23° C.): | 500 mPa · s |
| free HDI content: | 0.05% |
| free IPDI content: | 0.2% |
| Iodine value: | 50 |
| Allophanate group content: | 158 mg/g (calculated) |
| Content of hydrocarbon chains having an average of 18 carbon atoms: | 380 mg/g |

Example 3

Clear Lacquer

A clear coating composition having the following formulation was prepared by mixing the individual components:
100 parts of the polyisocyanate mixture of Example 1
1.6 parts of a 35% solution of zinc octoate in white spirit (Octa Soligen Zink 8)
1.5 parts of dibutyltin(IV) dilaurate (10% in MPA) of H. C. Starck, Germany The clear coating composition was applied to a cleaned glass plate in a layer thickness of 100 μm and cured at room temperature. A solvent-resistant coating was obtained, which was fully dry after 5.5 hours at room temperature.

Example 4

Pigmented Lacquer

A pigmented coating composition having the following composition was prepared by mixing the individual components:

| 56 parts | of the polyisocyanate mixture of Example 1, |
|---|---|
| 1.2 parts | of a wetting and dispersing agent (Disperbyk 163, Byk-Chemie GmbH) |
| 2.2 parts | of toluene sulfonyl isocyanate (siccative) |
| 36.6 parts | of titanium dioxide (Bayertitan R-KB-3, Bayer AG) |
| 3.2 parts | of the zinc octoate solution from Example 3 |
| 0.9 part | of dibutyltin(IV) dilaurate (10% in MPA) |

The coating composition was applied to a glass plate in a layer thickness of 100 μm. A solvent-resistant coating was obtained, which was fully dry after 5 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An olefinically unsaturated polyisocyanate containing allophanate groups and having
   a) an NCO content of 6 to 20% by weight,
   b) a content of olefinic double bonds corresponding to an iodine value of 15 to 150,
   c) a content of hydrocarbon chains containing 12 to 30 carbon atoms of 100 to 700 mg/g and
   d) a content of allophanate groups (expressed as $C_2HN_2O_3$, molecular weight=101) of 10 to 300 mg/g.

2. The polyisocyanate of claim 1 wherein said olefinically unsaturated polyisocyanate is prepared from 1,6-diisocyanatohexane and/or 1-isocyanato-3,3,5-trimethyl-5-isocyanatomethyl cyclohexane.

3. A process for the production of an olefinically unsaturated polyisocyanate containing allophanate groups and having
   a) an NCO content of 6 to 20% by weight,
   b) a content of olefinic double bonds corresponding to an iodine value of 15 to 150,
   c) a content of hydrocarbon chains containing 12 to 30 carbon atoms of 100 to 700 mg/g and
   d) a content of allophanate groups (expressed as $C_2HN_2O_3$, molecular weight=101) of 10 to 300 mg/g, which comprises
   1) preparing an isocyanate component U containing urethane groups by reacting at an NCO:OH equivalent ratio of 4:1 to 120:1
      A1) a polyisocyanate component having an NCO content of 20 to 61% by weight and an average NCO functionality of 1.8 to 2.5 and containing one or more organic polyisocyanates with
      B) an alcohol component having an average hydroxyl functionality of 1.0 to 1.8 and containing
         B1) 80 to 100% by weight, based on the weight of alcohol component B), of an olefinically unsaturated alcohol component having an iodine value greater than 60 and containing one or more olefinically unsaturated alcohols having a hydrocarbon chain with an average chain length of at least 12 carbon atoms and
         B2) 0 to 20% by weight, based on the weight of alcohol component B) of a saturated alcohol component containing one or more saturated alcohols having a molecular weight of 32 to 300,
   2) reacting isocyanate component U with
      A2) a polyisocyanate component having an NCO content of 20 to 61% by weight and an average NCO functionality of 1.8 to 2.5 and containing one or more organic polyisocyanates, at an equivalent ratio of isocyanate groups of component A2) to urethane groups of component U of at least 3:1 and optionally in the presence of catalysts accelerating the reaction of urethane groups with isocyanate groups to form allophanate groups and 3) subsequently removing excess, distillable starting polyisocyanates by distillation to obtain a product containing at most 0.5% by weight of said distillable starting polyisocyanates.

4. The process of claim 3 which comprises carrying out reaction steps 1) and 2) in a single stage at a temperature of 30 to 200° C. such that polyisocyanate component A2) corresponds to the excess of starting polyisocyanate A1) present in the reaction mixture after the formation of isocyanate component U.

5. The process of claim 3 which comprises carrying out reaction steps 1) and 2) in two stages such that polyisocyanate component A2) is a mixture of i) excess starting polyisocyanate A1) present in the reaction mixture after the formation of isocyanate component U) and ii) additional starting polyisocyanate added after step 1) and prior to step 2).

6. The process of claim 3 wherein starting polyisocyanates A1) and A2) comprise a member selected from the group consisting of 1,6-diisocyanatohexane, 1-isocyanato-3,3,5-trim ethyl-5-isocyanatomethyl cyclohexane and mixtures thereof.

7. The process of claim 4 wherein starting polyisocyanates A1) and A2) comprise a member selected from the group consisting of 1,6-diisocyanatohexane, 1-isocyanato-3,3,5-trimethyl-5-isocyanatomethyl cyclohexane and mixtures thereof.

8. The process of claim 5 wherein starting polyisocyanates A1) and A2) comprise a member selected from the group consisting of 1,6-diisocyanatohexane, 1-isocyanato-3,3,5-trimethyl-5-isocyanatomethyl cyclohexane and mixtures thereof.

9. The process of claim 3 wherein component B) contains 100% of component B1) and said hydrocarbon chain has an average chain length of 14 to 20 carbon atoms.

10. The process of claim 4 wherein component B) contains 100% of component B1) and said hydrocarbon chain has an average chain length of 14 to 20 carbon atoms.

11. The process of claim 5 wherein component B) contains 100% of component B1) and said hydrocarbon chain has an average chain length of 14 to 20 carbon atoms.

12. The process of claim 6 wherein component B) contains 100% of component B1) and said hydrocarbon chain has an average chain length of 14 to 20 carbon atoms.

13. The process of claim 7 wherein component B) contains 100% of component B1) and said hydrocarbon chain has an average chain length of 14 to 20 carbon atoms.

14. The process of claim 8 wherein component B) contains 100% of component B1) and said hydrocarbon chain has an average chain length of 14 to 20 carbon atoms.

15. A one-component coating composition, which may be cured in the presence of oxidation or moisture, comprising a mixture of (i) a binder consisting essentially of the olefinically unsaturated polyisocyanate of claim 1 and a (ii) catalyst which accelerates an oxidative crosslinking reaction.

* * * * *